(12) United States Patent
Han et al.

(10) Patent No.: US 8,907,924 B2
(45) Date of Patent: Dec. 9, 2014

(54) INFORMATION DETECTION DISPLAY

(75) Inventors: Sang-Youn Han, Seoul (KR);
Dong-Kwon Kim, Asan-si (KR);
Kyung-Sook Jeon, Yongin-si (KR);
Sung-Hoon Yang, Seoul (KR); Joo-Han Kim, Yongin-si (KR); Woong-Kwon Kim, Cheonan-si (KR); Suk-Won Jung, Goyang-si (KR); Byeong-Hoon Cho, Seoul (KR); Dae-Cheol Kim, Hwaseong-si (KR); Hui-Sung Lee, Asan-si (KR); Ki-Hun Jeong, Cheongan-si (KR); Seung-Mi Seo, Seoul (KR); Jung-Suk Bang, Guri-si (KR); Kun-Wook Han, Seongnam-si (KR); Mi-Seon Seo, Seoul (KR)

(73) Assignee: Samsung Display Co., Ltd. (KR)

( * ) Notice: Subject to any disclaimer, the term of this patent is extended or adjusted under 35 U.S.C. 154(b) by 223 days.

(21) Appl. No.: 13/090,991

(22) Filed: Apr. 20, 2011

(65) Prior Publication Data

US 2011/0261040 A1 Oct. 27, 2011

(30) Foreign Application Priority Data

Apr. 23, 2010 (KR) .................... 10-2010-0037914

(51) Int. Cl.
*G06F 3/042* (2006.01)
*G06F 3/041* (2006.01)

(52) U.S. Cl.
CPC .............. *G06F 3/0418* (2013.01); *G06F 3/042* (2013.01)

USPC ........................................ 345/175; 178/18.09

(58) Field of Classification Search
USPC .......................................................... 348/204
See application file for complete search history.

(56) References Cited

U.S. PATENT DOCUMENTS

| 7,773,139 B2 * | 8/2010 | den Boer et al. .............. 348/302 |
| 2005/0280622 A1 * | 12/2005 | Lee et al. ......................... 345/96 |
| 2006/0132463 A1 * | 6/2006 | Lee et al. ...................... 345/173 |
| 2011/0012879 A1 * | 1/2011 | Uehata et al. .................. 345/207 |

FOREIGN PATENT DOCUMENTS

| JP | 10-073843 A | 3/1998 | |
| KR | 1020070002311 A | 1/2007 | |
| KR | 1020080002278 A | 1/2008 | |
| KR | 1020080077807 A | 8/2008 | |
| WO | WO 2009125644 A1 * | 10/2009 | .............. G09G 3/36 |

* cited by examiner

*Primary Examiner* — Quan-Zhen Wang
*Assistant Examiner* — Chad Dicke
(74) *Attorney, Agent, or Firm* — Innovation Counsel LLP (57) ABSTRACT

An information detection device includes: a plurality of light sensing units each configured to detect light; a plurality of sensor scanning drivers each configured to apply sensor scanning signals to the light sensing units; a sensing signal processor configured to receive position information detected by the light sensing units; a plurality of bias applying units each configured to apply bias voltages to the light sensing units; wherein each bias applying unit applies a different polarity of bias voltage.

12 Claims, 4 Drawing Sheets

INFORMATION DETECTION DISPLAY

CROSS-REFERENCE TO RELATED APPLICATION

This application claims priority to and the benefit of Korean Patent Application No. 10-2010-0037914 filed in the Korean Intellectual Property Office on Apr. 23, 2010, the entire contents of which are incorporated herein by reference.

BACKGROUND OF THE INVENTION

1. Field of the Invention

The present invention relates to an information detection display more particularly, to an information detection display that includes a light sensing unit.

2. Description of the Related Art

A liquid crystal display includes substrates on which pixel electrodes and a common electrode are formed, and a liquid crystal layer disposed between the substrates. The pixel electrodes are disposed on one of the substrates as a matrix. Each pixel electrode is connected to a switching element, such as a thin film transistor (TFT), which applies data voltages to the pixel electrode. The common electrode is formed on the opposite substrate, on which the pixel electrodes are not formed, and has a common voltage. The common electrode faces the pixel electrodes, creating a liquid capacitor with the liquid crystal layer disposed between the electrodes. The liquid capacitor and the switching elements connected to each pixel form unit pixel, and the plurality of unit pixels are disposed as matrix.

An information detection display is a display that can detect position information or touch information from, for example, a finger or stylus applied to the surface of the display.

The position information or touch information of a selected position in a predetermined area of such an information detection display is detected by detecting a variation in resistance or light. When resistance is used to detect position information, a plurality of resistive lines are disposed on the lower and upper substrates, and extend vertically or horizontally. The resistive lines contact each other as a result of external stimulus, for instance a touch to the surface of the display, and vary the resistance thereof. The device senses the variation of the resistance to find the position or touch information. On the other hand, when light is used, light sensing units that can sense variations in the amount of light, or amount of light having a predetermined wavelength, are used to detect the position information or the touch information.

A device using the resistive method is usually formed on a transparent substrate and can be easily combined with other display devices. However, the resistive method decreases the luminance of the display device, and increases the thickness of the product. On the other hand, a device using the light sensing method usually includes light sensing units incorporated into the display device, and such light sensing units typically do not increase the thickness of the device. Thus, research is ongoing on devices that utilize the light sensing method.

When light sensing units are incorporated into a display device, the light sensing units can be affected by other components of display device. For example, the light sensing unit is affected by extraneous light, variations in temperature, and also applied bias voltage. Particularly, bias voltage applied to the light sensing unit can change the threshold voltage of the thin film transistor. The change in threshold voltage affects a number of characteristic of thin film transistors included in the light sensing unit, which can affect the performance of the device.

BRIEF SUMMARY OF THE INVENTION

An information detection display device that reduces the problems that can occur as a result of bias voltage applied to light sensing unit is provided.

An information detection device is provided that includes: a plurality of light sensing units each configured to detect light; a plurality of sensor scanning drivers configured to apply sensor scanning signals to the light sensing unit; a sensing signal processor configured to receive position information the light sensing unit detects; a plurality of bias applying units configured to apply bias voltages to the light sensing units; wherein each bias applying unit applies bias voltages having opposite polarities.

The plurality of light sensing units may be divided into a first group and a second group, the light sensing units of the first group and the light sensing unit of the second group may be alternately arranged, the plurality of sensor scanning drivers may include a first sensor scanning driver and a second sensor scanning driver, the plurality of bias applying units may include a first bias applying unit and a second bias applying unit, the light sensing units of the first group may be connected to the first sensor scanning driver and the first bias applying unit, and the light sensing units of the second group may be connected to the second sensor scanning driver and the second bias applying unit.

The light sensing unit may include a first sensor scanning driver connected to the light sensing units in (m,n)th cells; a second sensor scanning driver connected to the light sensing units in (k,p)th cell; where m and n are each natural numbers; if m is an even number, then n is even an number; and if m is an odd number, then n is odd number; and where k and p are each natural numbers; if k is an even number, then p may be odd number; and if k is an odd number, then p may be even number.

In one aspect, a first sensor scanning driver may be connected to the light sensing units in even numbered row; a second sensor scanning driver may be connected to the light sensing unit in odd numbered row.

In another aspect, a first sensor scanning driver may be connected to the light sensing units in odd numbered rows, and second sensor scanning driver may be connected to the light sensing units in even numbered rows.

The time when the first sensor scanning driver may output sensor scanning signals is prior to the time when the second scanning driver outputs sensor scanning signal.

The bias applying unit may include a first bias applying unit configured to apply bias voltages to the light sensing units connected to the first sensor scanning driver, and a second bias applying unit configured to apply bias voltages to the light sensing units connected to the second sensor scanning driver.

The first and the second bias applying units may apply first and second bias voltages while the first sensor scanning driver outputs sensor scanning signals, and third and fourth bias voltage while the second sensor scanning driver outputs sensor scanning signals. The polarity of the first bias voltage may be opposite to that of the third bias voltage, and the polarity of the second bias voltage may be opposite to that of the fourth bias voltage.

The light sensing unit may be configured to detect at least one of infrared rays or visible rays.

The light sensing unit may include a sensing element configured to detect at least one of infrared rays or visible rays; a capacitor configured to discharge stored charge if the sensing element detects at least one of infrared rays or visible rays; and a lead-out element configured to output a light detection signal according to the discharge of the capacitor.

The sensing element may include a transistor.

In another aspect, an information detection device includes a light sensing unit detecting light and divided into a first group and a second group; a first sensor scanning driver connected to the first group of light sensing units and configured to apply sensor scanning signals to the first group of light sensing units; a second sensor scanning driver connected to the second group of light sensing units and configured to apply sensor scanning signals to the second group of light sensing units; wherein the light sensing units are configured to begin detecting upon application of a bios voltage to the light sensing unit, the bias voltage applied to the light sensing units of the first group is a first polarity while sensor scanning signal is applied to the light sensing units of the first group; and bias voltage applied to the light sensing unit of the first group is a second polarity while sensor scanning signal is applied to the light sensing unit of the second group.

The second sensor scanning driver may output the sensor scanning signal after the sensor scanning signal is applied to all light sensing units connected to the first sensor scanning driver.

Bias voltage applied to the light sensing units of the second group may be the second polarity while the sensor scanning signal is applied to the light sensing unit of the first group; and bias voltage applied to the light sensing units of the second group may be the first polarity while sensor scanning signal is applied to the light sensing unit of the second group.

The information detection display decreases the changing of the threshold voltage by bias voltage.

BRIEF DESCRIPTION OF THE DRAWINGS

The advantages and characteristics of the present disclosure will become more apparent by describing exemplary embodiments in detail with reference to the accompanying drawing in which.

DETAILED DESCRIPTION OF EMBODIMENTS

Exemplary embodiments will now be described more fully hereinafter with reference to the accompanying drawings.

In the drawings, the thickness of layers and regions are exaggerated for clarity. Like numerals refer to like elements throughout. It will be understood that when an element such as a layer, region or substrate is referred to as being "on" another element, it can be directly on the other element, or intervening elements may also be present. In contrast, when an element is referred to as being "directly on" another element, there are no intervening elements present.

Figure 1:
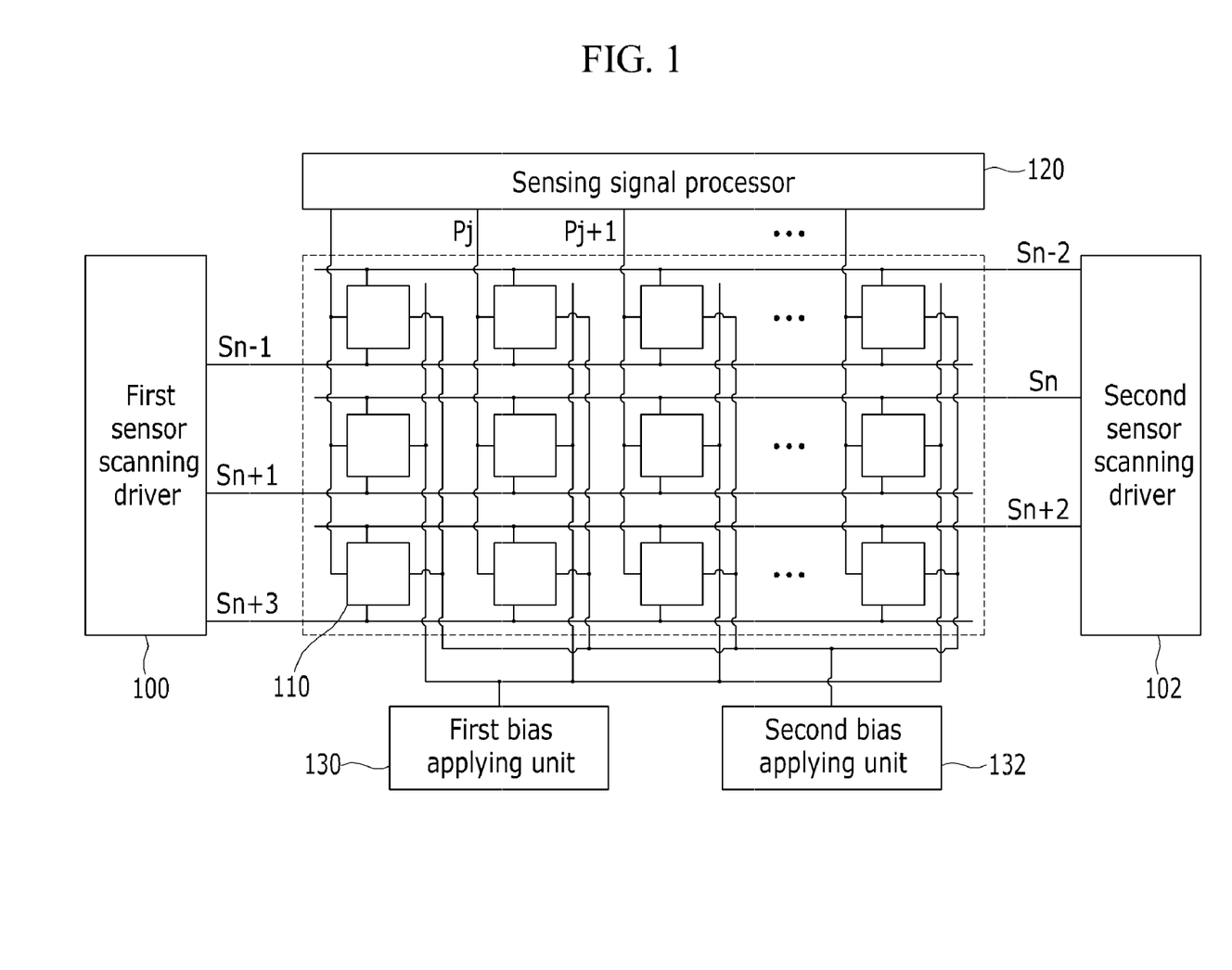
FIG. 1 is a block diagram of an information detection device according to an exemplary embodiment.

FIG. 1 is a block diagram of an information detection device according to an exemplary embodiment.

Referring to FIG. 1, the information detection device according to an exemplary embodiment comprises a plurality of sensor scanning drivers 100, 102, light sensing units 110, a controller (not shown), a sensing signal processor 120, and bias applying units 130, 132.

The signal lines S, P comprise a plurality of sensor scanning lines S1-Sn transmitting sensor scanning signals and a plurality of sensor data lines P1-Pj transmitting sensor signals. The sensor scanning lines S1-Sn extend substantially in a row direction and substantially parallel to each other, while the sensor data lines P1-Pj extend substantially in a column direction and substantially parallel to each other.

The sensor scanning drivers 100, 102 output sensor scanning signals to the plurality of light sensing unit 110. The sensor scanning drivers 100, 102 include a first sensor scanning driver 100 and a second sensor scanning driver 102.

The first sensor scanning driver 100 is connected to the light sensing unit 110 in the (m,n)th cell, where m and n are each a natural number. If m is an even number, n is an even number. If m is an odd number, n is an odd number. For example, the first sensor scanning driver 100 is connected to the light sensing unit 110 in (1, 1)th, (1, 3)th, . . . (2, 2)th, (2, 4)th, . . . (3, 1)th . . . cells.

The second sensor scanning driver 102 is connected to the light sensing units in the (k,p)th cell, where k and p are each a natural number. In this case, if k is an odd number, p is an even number. If k is an even number, p is an odd number. For example, the second sensor scanning driver 102 is connected to the light sensing unit 110 in (1, 2)th, (1, 4)th, . . . (2, 1)th, (2, 3)th, . . . (3, 2)th cells.

The light sensing units 110 that are connected to the first sensor scanning driver 100 are classified as light sensing units of the first group, and the light sensing units 110 that are connected to the first sensor scanning driver 102 are classified as the light sensing units of the second group. The light sensing units of the first group and the light sensing units of the second group may be alternately arranged with a checkered pattern.

The first sensor scanning driver 100 and the second sensor scanning driver 102 alternately output sensor scanning signals. Namely, after the first sensor scanning driver 100 outputs sensor scanning signals to all light sensing unit 110 connected to the first sensor scanning driver 100, the second sensor scanning driver 102 starts to output sensor scanning signals to all light sensing unit 110 connected to the second sensor scanning driver 102.

The embodiments are not, however, limited to the configuration in which the first sensor scanning driver 100 and the second sensor scanning driver 102 are connected to the light sensing unit 110 described above. For example, the first sensor scanning driver 100 may be connected to the light sensing unit 110 in the odd numbered rows, and the second sensor scanning driver 102 may be connected to the light sensing unit 110 in the even numbered rows. Alternatively the first sensor scanning driver 100 is connected to the light sensing unit 110 in the odd numbered columns, and the second sensor scanning driver 102 is connected to the light sensing unit 110 in the even numbered columns.

In the present exemplary embodiment, after the information detection device is turned on, the time when the first sensor scanning driver 100 outputs sensor scanning signals is before the time when the second sensor scanning driver 102 outputs sensor scanning signals. The time when the first sensor scanning driver 100 and second sensor scanning driver 102 output sensor scanning signal is not limited to above embodiment. For instance, the time when the second sensor scanning driver 102 outputs sensor scanning signals may be before the time when the first sensor scanning driver 100 outputs sensor scanning signals, according to control of the controller.

As will be described in more detail below with respect to FIG. 2, the light sensing unit 110 includes a sensing element and a lead-out element. The sensing element includes an infrared ray sensing transistor or a visible ray sensing transistor. The lead-out element includes a transistor, which is connected to the infrared ray sensing transistor or the visible ray sensing transistor. When light illuminates the light sensing unit 110, the lead-out element outputs a sensing signal.

Figure 2:
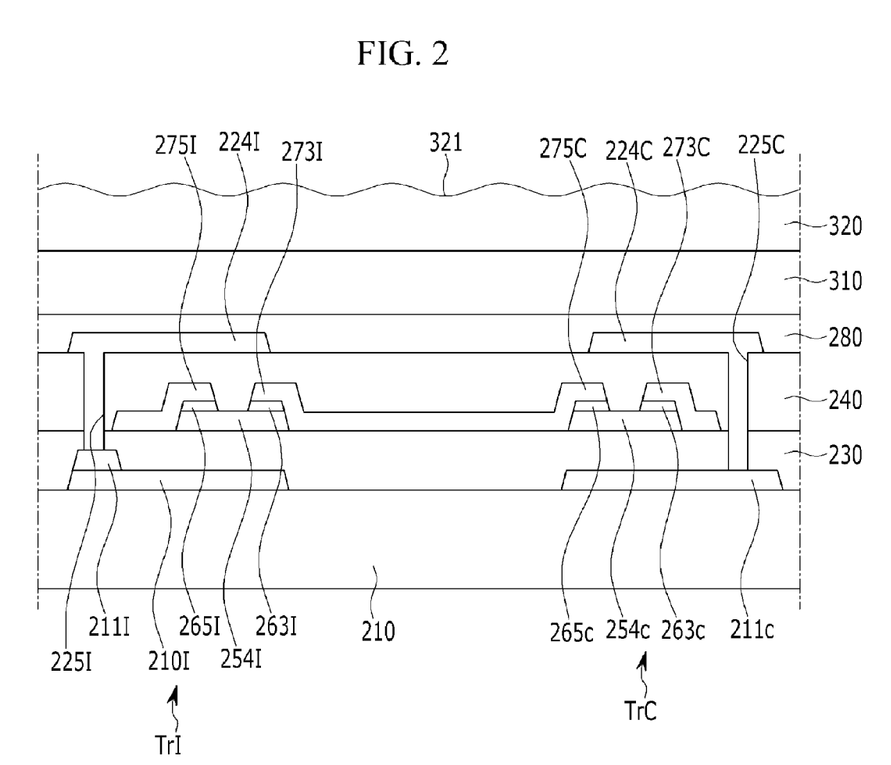
FIG. 2 is a view showing a cross-section of an infrared ray sensing transistor and a lead-out element connected to the infrared ray sensing transistor according to an exemplary embodiment.

FIG. 2 is a view showing a cross-section of an infrared ray sensing transistor and a lead-out element connected to the infrared ray sensing transistor according to an exemplary embodiment.

Referring to FIG. 2, the infrared ray sensing transistor TrI includes a semiconductor layer 254I, a resistive contact layer 263I, 265I, a source electrode 273I, a drain electrode 275I, a gate insulator 240, a lower gate electrode 211I and an upper gate electrode 224I.

A light blocking layer 210I is formed on the substrate 210 and overlaps the semiconductor layer 254I. The light blocking layer 210I prevents the semiconductor layer 254I from being exposed to visible light rays that enter from, for example, the backlight. The light blocking layer 210I comprises material for blocking visible light rays. For example, the light blocking layer 210I may include an organic material or amorphous silicon including a black pigment.

The light blocking layer 210I blocks visible light rays that are incident onto the liquid crystal display and increases signal to noise ratio (SNR). The light blocking layer 210I suits the sensitivity of the semiconductor layer 254I, which includes amorphous silicon-germanium or amorphous germanium, for infrared light. The light blocking layer 210I blocks visible light rays effectively.

The lower gate electrode 211I is formed on a portion of the light blocking layer 210I. A blocking insulator 230 that includes an insulating material such as, for example, silicon nitride is formed on the substrate 210 and covers the lower gate electrode 211I. Thickness of the blocking insulator 230 is typically between 3000 angstroms and 10000 angstroms. If the thickness of the blocking insulator 230 is less than 3000 angstroms, a characteristic curve of the infrared ray will have a large variation because the sensitivity of infrared ray varies strongly according to the variation of the voltage Vgs between the gate and the source. If the thickness of the blocking insulator 230 is more than 10000 angstroms, the transistor cannot be miniaturized.

The semiconductor layer 254I formed on the blocking insulator 230 includes, for example, amorphous silicon-germanium or amorphous germanium. If the semiconductor layer includes amorphous silicon-germanium or amorphous germanium, the infrared ray sensing transistor has good sensitivity to infrared light. The thickness of the semiconductor layer 254I is typically between 3000 angstrom and 10000 angstrom. If the thickness of the semiconductor layer 254I is less than 3000 angstrom, the sensitivity to infrared rays is too low, if the thickness of the semiconductor layer 254I is more than 10000 angstrom, the transistor cannot be miniaturized.

The resistive contact layer 263I, 265I is formed on the semiconductor layer 254I. The source electrode 273I is formed on the resistive contact layer 263I. The drain electrode 275I is spaced apart from the source electrode 273I and is formed on the resistive contact layer 265I.

The gate insulator 240 covers the semiconductor layer 254I, the source electrode 273I and the drain electrode 275I. A contact hole 225I, for connecting the lower gate electrode 211I to the upper gate electrode 224I, is provided through gate insulator 240 and the blocking insulator 230. A portion of the source electrode 273I overlaps a portion of a data line for storage 227 (shown in FIG. 3) to form the infrared ray sensing storage Cp (see FIG. 4). The infrared ray sensing storage Cp detects infrared rays through a change of capacitance in the infrared ray sensing storage Cp. The thickness of the gate insulator 240 is typically between 3000 angstroms and 10000 angstroms. If the thickness of the gate insulator 240 is less than 3000 angstroms, the sensitivity to infrared rays is too low, if the thickness of the gate insulator 240 is more than 10000 angstroms, the transistor cannot be miniaturized.

The upper gate electrode 224I formed on the gate insulator 240 overlaps the semiconductor layer 254I and is connected to the lower gate electrode 211I through the contact hole 225I.

The light blocking layer 210I contacts the lower gate electrode 211I, which is connected to the upper gate electrode 224I, and prevents errors in operation of the transistor. If the light blocking layer 210I is not separated from the gate electrode, the blocking layer affects operation of the transistor because the light blocking layer 210I absorbs external light and produces charge. This problem is prevented by connecting the blocking layer 210I to the upper gate electrode 224I through the lower gate electrode 211I. Additionally, a designated amount of gate voltage is applied to the blocking layer 210I to prevent errors in the operation of the transistor due to the blocking layer 210I.

A protective layer 280 is formed on the gate electrode 224I to protect the gate electrode 224I.

A lead-out transistor TrC transmits input signal to the source electrode 273C (FIG. 2), which is connected to a sensor data line (P1-Pm in FIG. 1). The lead-out transistor TrC is connected to the source electrode 273C through the drain electrode 275C.

The lead-out transistor TrC includes a semiconductor layer 254C, resistive contact layer 263C, 265C, a source electrode 273C, a drain electrode 275C, a gate insulator 240, a lower gate electrode 211C and a upper gate electrode 224C.

The lower gate electrode 211C is formed on the substrate 210 and overlaps the semiconductor layer 254C. The light blocking layer 210C includes an insulator material such as, for example, silicon nitride and is formed on the substrate 210 so that a portion of the light blocking layer overlaps with the lower gate electrode 211C.

The semiconductor layer 254C is formed on the blocking insulator 230 and includes, for example amorphous silicon. The thickness of the semiconductor layer 254C is typically between 500 angstroms and 3000 angstroms. If the thickness of the semiconductor 254C is less than 500 angstroms, a channel region is not formed uniformly. If the thickness of the semiconductor 254C is more than 3000 angstroms, the transistor cannot be miniaturized.

The resistive contact layer 263C, 265C is formed on the semiconductor layer 254C. The source electrode 273C is formed on the resistive contact layer 263C. The drain electrode 275C is spaced apart from the source electrode 273C is formed on the resistive contact layer 265C.

The gate insulator 240 covers the semiconductor layer 254C, the source electrode 273C and the drain electrode 275C. A contact hole 225C, for connecting the lower gate electrode 211C to upper gate electrode 224C, is provided through the gate insulator 240 and the blocking insulator 230.

The upper gate electrode 224C is formed on the gate insulator 240 and overlaps the semiconductor layer 254C. The upper gate electrode 224C is connected to the lower gate electrode 211C through the contact hole 225C. The upper gate electrode 224C prevents the semiconductor 254C from being exposed to visible light rays.

The protective layer 280 is formed on the upper gate electrode 224C to protect the upper gate electrode 224C.

Figure 3:
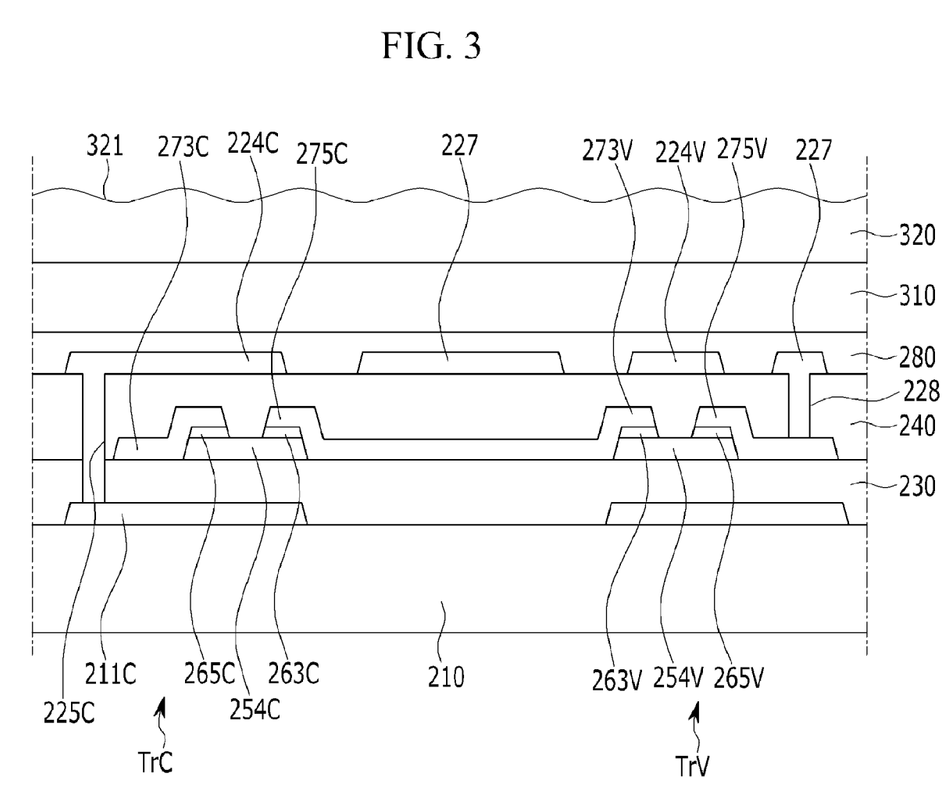
FIG. 3 is a view showing a cross-section of a visible ray sensing transistor and a lead-out element connected to the visible ray sensing transistor.

FIG. 3 is a view of the lead-out element TrC connected to the visible ray sensing transistor and the visible ray sensing transistor. The visible ray sensing transistor TrV comprises a semiconductor layer 254V, a resistive contact layer 263V, 265V, a source electrode 273V, a drain electrode 275V, a gate insulator 240 and a gate electrode 224V.

The blocking insulator 230 which includes insulator material such as, for example, silicon nitride is formed on the substrate 210. The semiconductor layer 254V is formed on the blocking insulator 230. The thickness of the semiconductor layer 254V is typically to between 500 angstroms and 3000 angstroms. If the thickness of the semiconductor layer 254V is less than 500 angstroms, a channel region is not formed uniformly. If the thickness of the semiconductor layer 254V is more than 3000 angstroms, the transistor cannot be miniaturized.

The resistive contact layer 263V, 265V is formed on the semiconductor layer 254V. The source electrode 273V is formed on the resistive contact layer 263V. The drain electrode 275V is spaced apart from source electrode 273V and is formed on the resistive contact layer 265V.

The gate insulator 240 covers the semiconductor layer 254V, the source electrode 273V and the drain electrode 275V. A contact hole 228 for connecting the drain electrode 275V to the data line for storage 227 is provided through gate insulator 240 and blocking insulator 230. Visible ray sensing storage Cp is formed because a portion of the source electrode 273V overlaps a portion of a data line for storage 277. The visible ray sensing storage Cp detects infrared rays through change of capacitance in the visible ray sensing storage Cp.

The gate electrode 224V is formed on the gate insulator 240 and overlaps the semiconductor layer 254V. The protective layer 280 is formed on the gate electrode 224V to protect gate electrode 224V.

A lead-out transistor TrC transmits an input signal to the source electrode 273C connected to a sensor data line. The lead-out transistor TrC is connected to the source electrode 273V of the visible ray sensing transistor TrV through the drain electrode 275V.

A blocking layer 310 is formed on the protective layer 280 covering infrared ray sensing transistor TrI, visible ray sensing transistor TrV and lead-out transistor TrC. The blocking layer 310 prevents infrared light rays and visible light rays illuminated from a backlight unit (not shown) from reaching the infrared ray sensing transistor TrI and visible ray light sensing transistor TrV.

A covering element is formed on the blocking layer 310. The covering element includes an organic layer. Although the blocking layer 310 prevents infrared rays and visible light rays illuminated from a backlight unit from reaching the infrared ray sensing transistor TrI and the visible ray sensing transistor TrV, a small amount of infrared rays may penetrate the blocking layer 310. Infrared rays can penetrate a blocking layer 310 which is less than 3 um.

Figure 4:
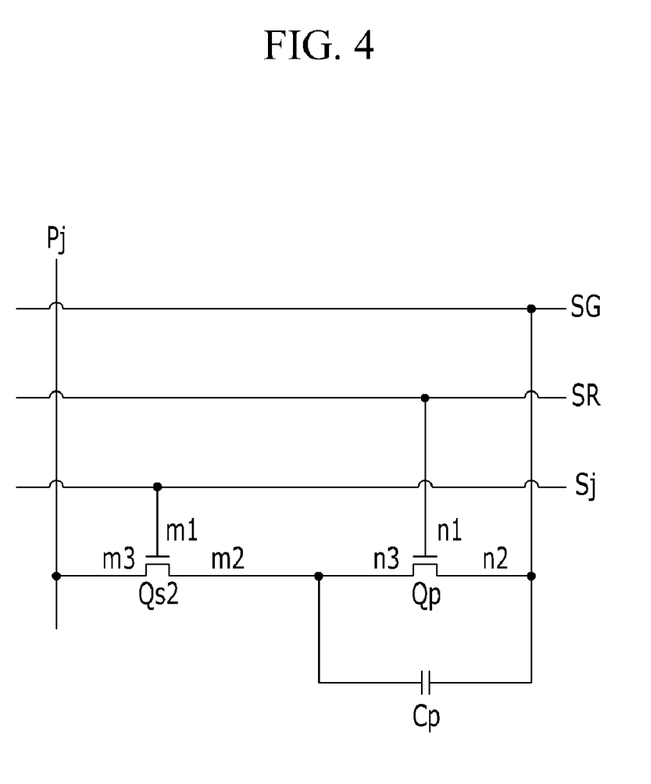
FIG. 4 is an equivalent circuit diagram of the light sensing unit in FIG. 1.

FIG. 4 is a view of equivalent circuit of the light sensing unit in FIG. 1. Referring to FIG. 4, the light sensing unit 110 includes sensing element Qp, lead-out element Qs2 connected to a sensor scanning lines Sj, sensor data lines Pj and a capacitor Cp.

The sensing element Qp detects visible ray and infrared light. The sensing element Qp is connected to a plurality of bias lines SG, SR, and includes a thin film transistor and detects light.

If sensing element Qp detects visible ray or infrared light, the capacitor Cp discharges its stored charge. That is, the capacitor Cp stores the voltage applied through the sensing data line Pj after the lead-out element Qs2 is turned-on, and then when the sensing data line Pj is again turned-on, in the case that the capacitor Cp has the lower voltage than the previous applied voltage, it is determined that the sensing element Qp has detected visible or infrared rays. For this, the lead-out element Qs2 outputs the changing value of the capacitance as the sensing signal to the sensing data line Pj when the turn-on voltage is applied to the corresponding sensor scanning lines Sj. The lead-out element Qs2 includes a thin film transistor. The lead-out element Qs2 is connected to the sensing scanning line Sj and the sensing data line Pj, and is turned on by the voltage applied to the sensing scanning line Sj and outputs a sensing signal to sensing data line Pj.

A control terminal n1 of the sensing element Qp is connected to the first bias line SR and an output terminal n2 is connected to the second bias line SG. The one terminal of the capacitor Cp is connected to the second bias line SG, the other terminal is connected to an input terminal n3 of the sensing element Qp. A control terminal m1 of the lead-out element Qs2 is connected to the sensing scanning line Sj, an output terminal m2 is connected to an input terminal n3 of the sensing element Qp and the input terminal m3 is connected to the sensing data line Pj.

The sensing element Qp is converted to the turned-off state when voltage of the control terminal n1 connected to the first bias line SR is less than that of the output terminal n2 connected to the second bias line SG. The capacitor Cp charges when there is a voltage difference between the output terminal n2 and the input terminal n3 of the sensing element Qp. The lead-out element Qs2 is converted to the turned-off state when the voltage of the control terminal m1 connected to the sensing scanning line Sj is less than that of the output terminal m2 connected to the input terminal n3 of the sensing element Qp.

If a channel region of the sensing element Qp is illuminated by infrared rays or visible rays, the capacitor Cp discharges its stored charge. The voltage stored in the capacitor Cp decreases by discharge.

Voltage applied to the control terminal m1 of the lead-out element Qs2 becomes higher than voltage applied to the output terminal m2 because voltage stored in the capacitor Cp decreases. The lead-out element Qs2 turns on because of voltage the difference between the control terminal m1 and output terminal m2. Charge moves through sensing data line Pj.

The sensing signal processor 120 (FIG. 1) receives the position information detected by the light sensing unit 110. The sensing signal processor 120 receives signal inputted through sensing data line Pj. The sensing signal processor 120 outputs a light detecting signal according to the signal received.

A plurality of the bias applying units 130, 132 apply bias voltage to the light sensing units 110 for detecting light. The bias applying units 130, 132 apply bias voltage to the bias lines SG, SR connected to the light sensing unit 110. The bias applying units 130, 132 include a first bias applying unit 130 that applies bias voltage to the light sensing unit 110 connected to the first sensor scanning driver 100, and a second bias applying unit 132 that applies bias voltage to the light sensing unit 110 connected to the second sensor scanning driver 102.

The first bias applying unit 130 applies first and second bias voltages to the first and second bias lines of the light sensing unit 110, while the first sensor scanning driver 100 outputs sensor scanning signals. The first bias applying unit 130 applies third and fourth bias voltages to the first and second bias lines of the light sensing unit 110, while the second bias applying unit 102 outputs sensor scanning signals. The polarity of the first bias voltage is opposite to that of the third bias voltage, and the polarity of the second bias voltage is opposite to that of the fourth bias voltage.

The second bias applying unit 132 applies fifth and sixth bias voltages to first and second bias lines of the light sensing unit 110, while the second sensor scanning driver 102 outputs sensor scanning signals. The second bias applying unit 132 applies seventh and eighth bias voltages to the first and second bias lines of the light sensing unit 110, while the first bias applying unit 130 outputs sensor scanning signals. Polarity of fifth bias voltage is different from that of seventh bias voltage, and polarity of sixth bias voltage is different from that of eighth bias voltage.

The second sensor scanning driver 102 doesn't output sensor scanning signals while the first sensor scanning driver 100 outputs sensor scanning signals, and the first sensor scanning driver 100 doesn't output sensor scanning signals while the second sensor scanning driver 102 outputs sensor scanning signals.

The controller controls the sensor scanning signal outputted from the sensor scanning drivers 100, 102 and bias voltage outputted from the bias applying unit 130, 132 and receives the light detecting signal outputted from light sensing unit 120. The controller transmits the light detecting signal to an external processor. The controller controls resetting of the sensing signal processor and the light sensing unit 110.

Although exemplary embodiments have been described in detail hereinabove, it should be clearly understood that many variations and/or modifications of the basic inventive concepts disclosed herein will fall within the spirit and scope of the present invention, as defined in the disclosure and appended claims.

What is claimed is:

1. An information detection display comprising:
   a plurality of light sensing units each configured to detect light, first and second sensor scanning drivers, wherein the first sensor scanning driver is configured to apply sensor scanning signals to a first group of the light sensing units and the second sensor scanning driver is configured to apply sensor scanning signals to a second group of the light sensing units;
   a sensing signal processor configured to receive position information detected by each of the light sensing units;
   a first bias applying unit configured to apply bias voltages to first and second bias lines of the first group of light sensing units, and a second bias applying unit configured to apply bias voltages to first and second bias lines of the second group of light sensing units,
   wherein while the first sensor scanning driver applies sensor scanning signals to the first group of the light sensing units, the first bias applying unit applies a first bias voltage to the first bias line of the first group of the light sensing units and a second bias voltage to the second bias line of the first group of the light sensing units, and
   while the second sensor scanning driver applies sensor scanning signals to the second group of the light sensing units, the first bias applying units applies a third bias voltage to the first bias line of the first group of light sensors and a fourth bias voltage to the second bias line of the first group of the light sensors, and
   wherein a polarity of the first voltage is opposite to a polarity of the third bias voltage and a polarity of the second bias voltage is opposite to a polarity of the fourth bias voltage, and
   wherein while the second sensor scanning driver applies sensor scanning signals to the second group of the light sensing units, the second bias applying unit applies a fifth bias voltage to the first bias line of the second group of the light sensing units and a sixth bias voltage to the second bias line of the second group of the light sensing units, and
   while the first sensor scanning driver applies sensor scanning signals to the first group of the light sensing units, the second bias applying units applies a seventh bias voltage to the first bias line of the first group of light sensors and an eighth bias voltage to the second bias line of the first group of the light sensors, and
   wherein a polarity of the fifth voltage is opposite to a polarity of the seventh bias voltage and a polarity of the sixth bias voltage is opposite to a polarity of the eighth bias voltage.

2. The information detection device of claim 1, further comprising:
   a second bias applying unit
   wherein the light sensing units of the first group and the light sensing unit of the second group are alternately arranged,
   the light sensing units of the first group are connected to the first sensor scanning driver and the first bias applying unit, and the light sensing units of the second group are connected to the second sensor scanning driver and the second bias applying unit.

3. The information detection device of claim 1, wherein:
   the first sensor scanning driver is connected to the light sensing units in (m,n)th cells;
   the second sensor scanning driver is connected to the light sensing units in (k,p)th cell;
   wherein m and n are each natural numbers;
   if m is an even number, then n is an even number; and if m is an odd number, then n is odd number; and wherein k and p are each natural numbers;
   if k is an even number, then p is an odd number; and if k is an odd number, then p is an even number.

4. The information detection device of claim 3, wherein:
   the time when the first sensor scanning driver outputs sensor scanning signals is prior to the time when the second scanning driver outputs sensor scanning signals.

5. The information detection device of claim 1, wherein:
   the first sensor scanning driver is connected to the light sensing units in even numbered rows; and the second sensor scanning driver is connected to the light sensing units in odd numbered rows.

6. The information detection device of claim 1, wherein:
   the first sensor scanning driver is connected to the light sensing units in odd numbered rows; and the second sensor scanning driver is connected to the light sensing units in even numbered rows.

7. The information detection device of claim 1, wherein:
   the light sensing unit is configured to detect at least one of infrared rays or visible rays.

8. The information detection device of claim 1, wherein each of the light sensing units comprises:
   a sensing element configured to detect at least one of infrared rays or visible rays;

a capacitor configured to discharge stored charge if the sensing element detects at least one of infrared rays or visible rays;

a lead-out element configured to output a light detection signal according to the discharge of the capacitor.

9. The information detection device of claim 8, wherein: the sensing element comprises transistor.

10. A information detection device comprising:

a plurality of light sensing units configured to detect light, wherein the plurality of light sensing units is divided into a first group and a second group;

a first sensor scanning driver connected the first group of light sensing and configured to apply sensor scanning signals to the first group of light sensing units through a first set of sensing scanning lines, and a second sensor scanning driver connected to the second group of light sensing units and configured to apply sensor scanning signals to the second group of light sensing units through a second set of sensing scanning lines;

a first bias applying unit configured to apply bias voltages to first and second bias lines of the first group of light sensing units, and a second bias applying unit configured to apply bias voltages to first and second bias lines of the second group of light sensing units, wherein while the first sensor scanning driver applies sensor scanning signals to the first group of the light sensing units, the first bias applying unit applies a first bias voltage to the first bias line of the first group of the light sensing units and a second bias voltage to the second bias line of the first group of the light sensing units, and while the second sensor scanning driver applies sensor scanning signals to the second group of the light sensing units, the first bias applying units applies a third bias voltage to the first bias line of the first group of light sensors and a fourth bias voltage to the second bias line of the first group of the light sensors, and wherein a polarity of the first voltage is opposite to a polarity of the third bias voltage and a polarity of the second bias voltage is opposite to a polarity of the fourth bias voltage, and wherein while the second sensor scanning driver applies sensor scanning signals to the second group of the light sensing units, the second bias applying unit applies a fifth bias voltage to the first bias line of the second group of the light sensing units and a sixth bias voltage to the second bias line of the second group of the light sensing units, and while the first sensor scanning driver applies sensor scanning signals to the first group of the light sensing units, the second bias applying units applies a seventh bias voltage to the first bias line of the first group of light sensors and an eighth bias voltage to the second bias line of the first group of the light sensors, and wherein a polarity of the fifth voltage is opposite to a polarity of the seventh bias voltage and a polarity of the sixth bias voltage is opposite to a polarity of the eighth bias voltage.

11. The information detection device of claim 10, wherein: the second sensor scanning driver is configured to output the sensor scanning signal after the sensor scanning signal is applied to all light sensing units connected to the first sensor scanning driver.

12. The information detection device of claim 11, wherein: the light sensing unit is configured to detect at least one of infrared rays or visible rays.

* * * * *